Oct. 11, 1960 — M. B. VORT — 2,955,367
SNOW PLOW BUMPER ATTACHMENT
Filed May 26, 1958 — 2 Sheets-Sheet 1
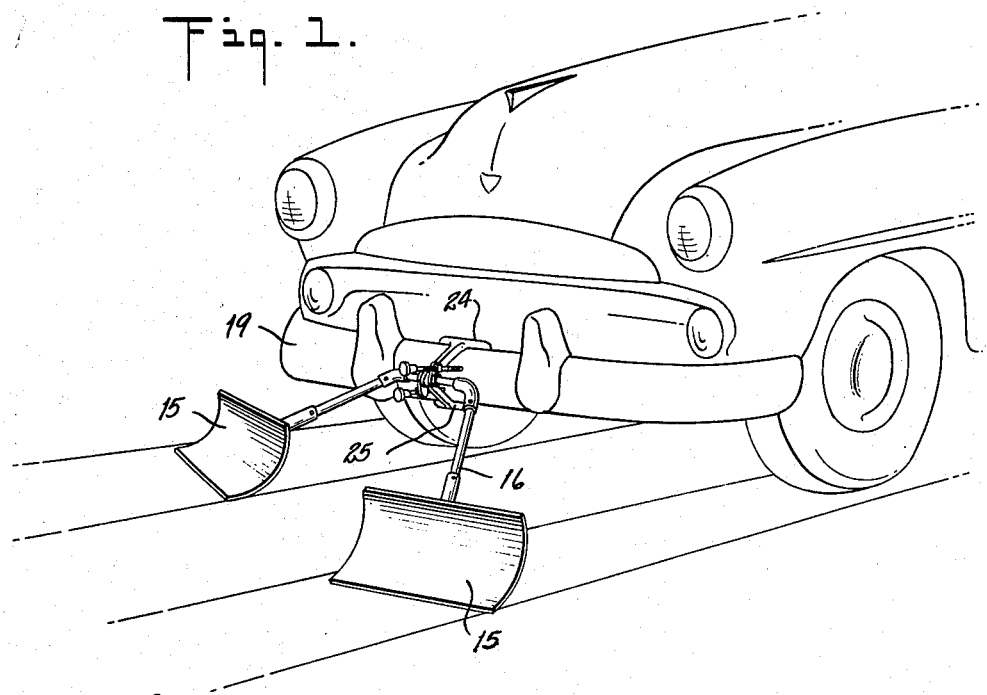
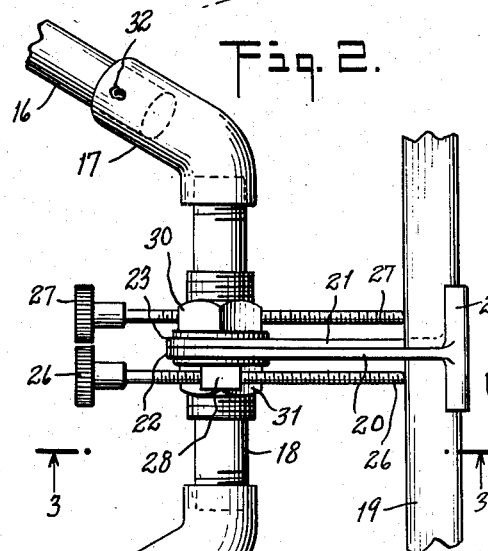
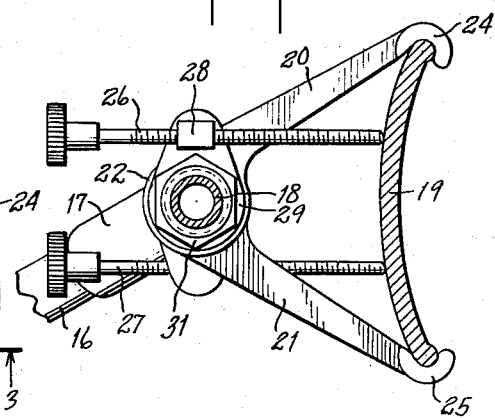
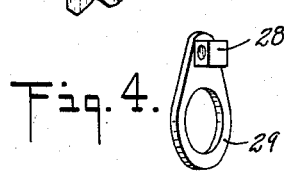
INVENTOR.
MAURICE B. VORT
BY
ATTORNEY Oct. 11, 1960
M. B. VORT
2,955,367
SNOW PLOW BUMPER ATTACHMENT
Filed May 26, 1958
2 Sheets-Sheet 2
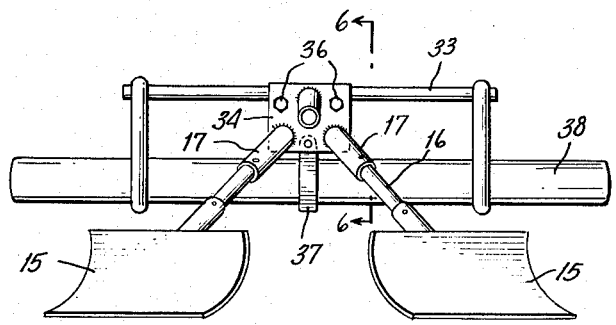
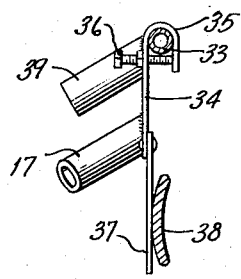
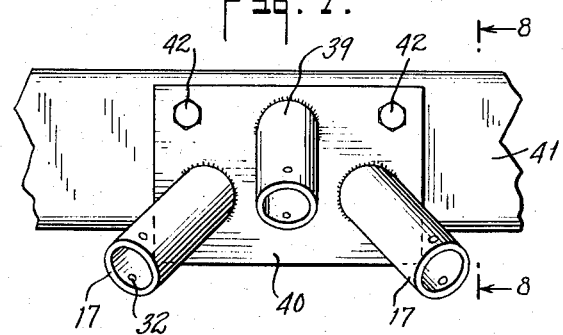
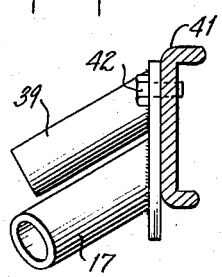
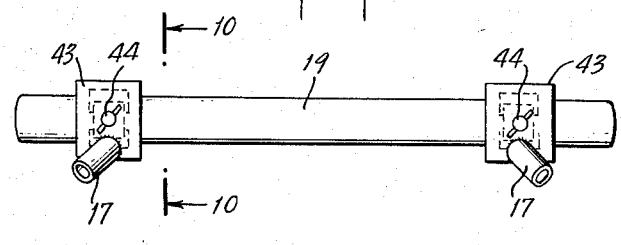
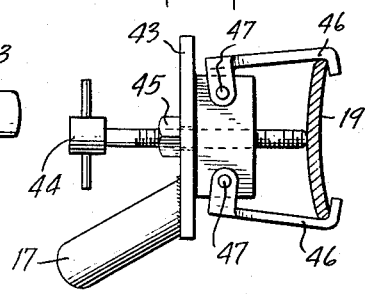
INVENTOR.
MAURICE B. VORT
BY
ATTORNEY

United States Patent Office 2,955,367
Patented Oct. 11, 1960

2,955,367

SNOW PLOW BUMPER ATTACHMENT

Maurice B. Vort, 11 Wooleys Lane, Great Neck, N.Y.

Filed May 26, 1958, Ser. No. 737,852

1 Claim. (Cl. 37—42)

The invention herein disclosed is a snow plow attachment for automobiles.

The general objects of the invention are to provide an attachment in the nature of a snow plow or snow shovel capable of being quickly mounted on the bumper of an automobile, for instance while the car is in the garage, and then be used to clear a track for the car by simply driving the car on out of the garage and out onto the driveway or roadway.

Other special objects of the invention are to provide a road clearing attachment of this character made up of few simple parts, rugged in design, adapted to be quickly applied or removed by any person and without any special tools and which can be made and sold at low cost.

Other desirable objects attained by the invention are set forth and will appear in the course of the following specification.

The drawings accompanying and forming part of the specification illustrate several different embodiments of the invention but structure may be further modified and changed as regards such illustration, all within the true intent and scope of the invention as hereinafter defined and claimed.

Fig. 1 is a perspective view illustrating a form of the invention made up of a pair of scoops or shovels mounted on the front bumper of an automobile.

Fig. 2 is an enlarged broken plan view of the same.

Fig. 3 is a cross sectional view of the supporting clamp engaged on the bumper bar, with parts appearing as on the plane of line 3—3 of Fig. 2.

Fig. 4 is a perspective view of one of the clamp nut flange members appearing in Fig. 3.

Fig. 5 is a front elevation of a bumperette type of snow plow mounting.

Fig. 6 is a cross sectional view on substantially the plane of line 6—6 of Fig. 5.

Fig. 7 is a broken front elevation of a directly mounted form of plow attachment.

Fig. 8 is a cross sectional view on line 8—8 of Fig. 7.

Fig. 9 is a front elevation of separately mounted snow plow attachments.

Fig. 10 is a cross section as on line 10—10 of Fig. 9.

The first embodiment of the invention illustrated in Figs. 1 to 4 comprises a pair of shovel-like scoops or blades 15, carried by shanks or stems 16, engaged in sockets 17 at the ends of a cross bar 18 adapted to be clamped to the bumper bar 19 of an automobile.

For lightness and strength the plow stems 16, sockets 17 and cross bar 18 may be made up of pipe or other tubular stock.

The clamp structure is shown as comprising a companion pair of hook levers 20, 21 having end portions 22, 23 engaged about the cross bar 18 and hook shaped ends 24, 25 engageable over upper and lower edges of the bumper bar.

Upper and lower hand screws 26, 27 extending through nuts 28 in the washers 29 clamped on the cross bar apply pressure above and below the center line of the bumper to adjustably and firmly secure the cross bar and the attachments dependent therefrom on the bumper bar.

The nut carrying washers 29 and hook levers 20, 21 are shown in Fig. 2 as solidly clamped together by nuts 30, 31 threaded on the cross bar at opposite sides of said washers and levers.

This construction allows a certain amount of self-adjustment for the screws 26, 27 to make proper thrust engagement with the curved front of the bumper bar, thus to securely lock the hook levers in their adjusted engagement over the bumper bar.

This clamp may be quickly attached and detached just by the use of the two hand screws shown. If necessary, the clamp nuts 30, 31 may be released or tightened as required to permit adjustment of the hook levers and nut washers or the securing of these parts in relatively fixed relation on the supporting bar 18.

The shovel or plow blades preferably are releasably mounted in the sockets 17.

Cotter pins or other fastenings may be used at 32, Fig. 2, to removably secure the stems of the shovel elements in the mounting sockets 17.

In the type of bumper bar shown in Figs. 5 and 6 having an upper guard rail 33 the mounting clamp may be in the form of a plate 34 having a hooked upper edge 35 which can be dropped down over the bar and held there by a clamp screw or screws 36 passed beneath the bar as shown in Fig. 6.

The mounting plate 34 is shown as braced at the bottom by a downward extension 37 bearing against the face of the bumper bar 38.

The snow plows are shown in this case as the twin shovels 15 in Fig. 1 having stems 16 detachably engaged in the divergent sockets 17 carried by the mounting plate 34.

As a further variation the mounting plate 34 is shown as carrying an extra socket 39 at the top in which another or some other form of shovel member may be mounted.

Figs. 7 and 8 illustrate a simplified form of the invention made up of a clamp plate 40 adapted to be secured directly over the face of a bumper bar 41 by bolts 42 extended through the plate into screw seats provided therefor in the bar.

This mounting plate is shown as having three sockets 17, 17 and 39 for the shovel or plow elements.

Figs. 9 and 10 illustrate another simplified embodiment of the invention comprising separate mounting plates 43, each carrying one socket 17 for a plow element and detachably secured on the bumper bar 19 by a hand screw 44 extending through a nut member 45 fixed on the plate into engagement with the front of the bumper bar to draw the companion hook levers 46 pivoted at 47 on the back of the plate into firmly gripped engagement over the upper and lower edges of the bar.

This last construction has the advantage that the shovel mounting clamps can be independently shifted to different positions on the bumper bar to suit different roadway conditions.

All forms of the invention are relatively simple and inexpensive and can be quickly applied while in the garage, before attempting to take the car out into snowy conditions.

The scoops or shovels may be adjusted up or down and shifted laterally to clear necessary portions of the roadway. If desired, small wheels or runners may be put on the scoops to enable them to ride over obstructions.

When through, the attachments may be quickly removed, the screws employed being either operable by hand, as first shown, or by simple wrench or pliers as in the other forms of the invention.

What is claimed is:

Attachment for clearing the roadway in front of the wheels of an automobile comprising a plate having a hook at the top engageable over the upper edge of a guard rail on a bumper and having an extension at the bottom engageable with a bumper, screw means for adjustably securing said plate fixed in supported engagement on the bumper, downwardly divergent sockets on the face of said plate, downwardly directed divergently inclined rods detachably secured at their upper ends in said sockets and reversely inclined plow blades on the lower ends of said rods angled to clear the roadway in front of wheels carrying the bumper on which said attachment is mounted.

References Cited in the file of this patent

UNITED STATES PATENTS

| | | |
|---|---|---|
| 1,262,966 | Mahon | Apr. 16, 1918 |
| 2,141,558 | Richter | Dec. 27, 1938 |
| 2,191,323 | Richter | Feb. 20, 1940 |
| 2,234,645 | Hetzelt | Mar. 11, 1941 |
| 2,283,436 | Hawkins | May 19, 1942 |
| 2,419,489 | Eliot | Apr. 22, 1947 |
| 2,430,221 | Frink et al. | Nov. 4, 1947 |
| 2,582,136 | Koblas | Jan. 8, 1952 |
| 2,722,064 | Jaffe et al. | Nov. 1, 1955 |